Patented Oct. 28, 1952

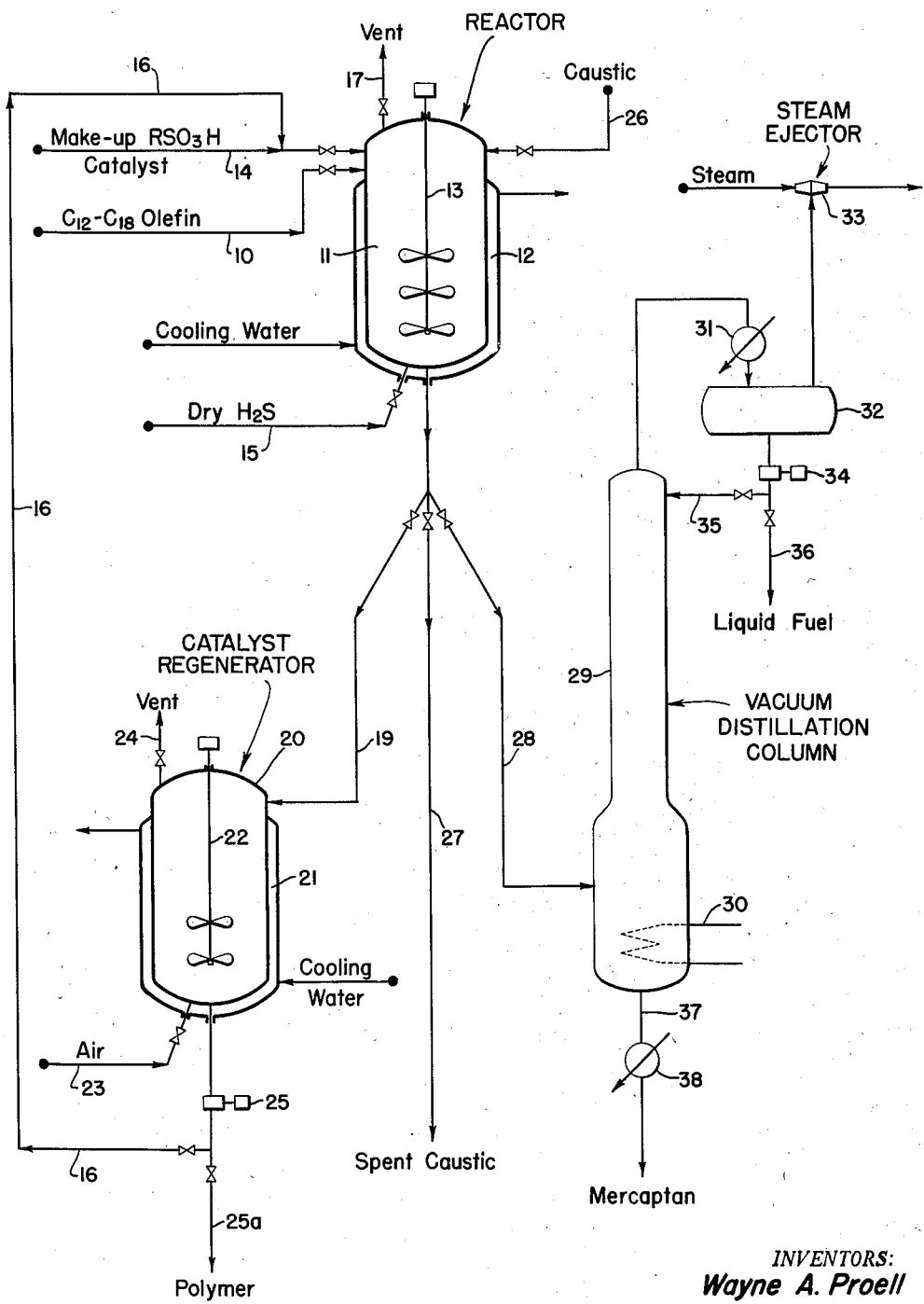

2,615,786

UNITED STATES PATENT OFFICE 2,615,786

HIGH BOILING MERCAPTAN PRODUCTION

Wayne A. Proell, Chicago, Ill., and William F. Wolff, Whiting, Ind., assignors to Standard Oil Company, Chicago, Ill., a corporation of Indiana Application August 28, 1948, Serial No. 46,664

13 Claims. (Cl. 23—2)

This invention relates to the use of alkanesulfonic acid catalysts under reaction conditions for effecting conversions involving liquid olefins and hydrogen sulfide and it pertains more particularly to an improved method and means for synthesizing tertiary mercaptans containing about 12 to 18 carbon atoms per molecule.

It is known that tertiary olefins and olefin polymers can be reacted with hydrogen sulfide by means of a wide variety of catalysts but these known processes are subject to serious disadvantages and particularly to the production of low yields when the reaction is directed to the production of mercaptans containing 12 to 18 carbon atoms per molecule. An object of the invention is to provide a simple, inexpensive, easily operable process which will produce remarkably high yields of the desired mercaptans at ordinary temperatures and pressures. Another object is to substantially eliminate undesirable side reactions. A further object is to provide a process wherein the nature of the conversion may be radically altered by simply changing charging stocks and temperatures. Another object is to provide an improved method for catalyst regeneration so that it may be effective for repeated use. Other objects will be apparent as the detailed description of the invention proceeds.

It has been found that when an isobutylene trimer is vigorously stirred with 5% to 25% by weight of 95-100% alkanesulfonic acid catalyst at about atmospheric pressure and at a temperature of about 30° C. with continuous introduction of a hydrogen sulfide containing gas, substantially all of the hydrogen sulfide can be absorbed from the gas and/or substantially all of the tertiary olefin can be converted to tertiary mercaptan. Mercaptan yields of about 60% are thus obtained. Under the same conditions the mercaptan yield in the case of 98% sulfuric acid catalyst is only about 10%, the yield with 85% phosphoric acid catalyst is only about 5%, and the yield with toluenesulfonic acid is only about 36%. With a charge which consists almost entirely of tertiary olefin, such for example as diisobutene, the mercaptan yield with the alkanesulfonic acid catalyst under these conditions may be as high as 98%. Increased yields are obtainable with olefin polymer charging stocks if said stocks are given a preliminary treatment with sulfuric acid and/or clay to remove diolefins, peroxide, etc.

A remarkable feature of using alkanesulfonic acid catalysts at temperatures below about 60° C. is the substantial elimination of undesirable side reactions such as polymerization and/or depolymerization.

With the same catalyst at a higher temperature range of the order of about 100 to 120° C., reaction of hydrogen sulfide can be obtained with primary and secondary olefins (which do not enter into the reaction at temperatures below 60° C.) and the products in this case are mixtures of secondary mercaptans and thioethers. At a still higher temperature range of the order of about 130 to 140° C. tertiary mercaptans can be substantially quantitatively decomposed to yield olefins and $H_2S$. Temperature is thus of critical importance in the use of alkanesulfonic acid catalysts and by proper selection of temperature and charging stocks a wide variety of $H_2S$-olefin reactions may be effected.

While the various reactions can be effected at substantially atmospheric pressure, reaction rate may be increased by employing somewhat higher pressure up to about 50 p. s. i. g. or more. Contact time will depend upon the intimacy of mixing and rate of $H_2S$ introduction; with rapid $H_2S$ introduction a contact time of only 15 minutes may be sufficient for complete conversion, but at lower $H_2S$ introduction rates a contact time of 2 to 4 hours may be required.

While a preferred embodiment of the invention is the production of $C_{12}$–$C_{18}$ tertiary mercaptans it should be understood that this process may be employed for separating tertiary from primary and secondary olefins or for removing hydrogen sulfide from fluid streams, the high temperature treatment being utilizable in such cases for converting mercaptans back to olefins and $H_2S$.

Repeated use of the catalyst is made possible by a regeneration step which comprises blowing the used catalyst with air or other inert gas at a temperature upwards of 100° C., preferably about 120° C. to 140° C. If water and sulfuric acid are excluded from the system regeneration may not be necessary. Any small amount of olefin polymer and sulfur formed in the regeneration step may be removed as a separate liquid layer.

The invention will be more clearly understood from the following detailed description read in conjunction with the accompanying drawing which forms a part of this specification and which is a schematic flow diagram of a commercial plant for producing 2,000,000 pounds per year of higher mercaptans.

The plant schematically represented by the drawing is a batch plant for use in a petroleum refinery wherein hydrogen sulfide is available in a continuous byproduct stream in amounts of about 170 pounds per hour and wherein higher olefins in amounts of about 1500 pounds per hour can be obtained as byproducts in isobutylene polymerization operations. The olefins, for example, may be $C_{12}$–$C_{18}$ olefins obtained as a byproduct in an isooctene plant wherein the olefins of a $C_4$ refinery stream are polymerized with a phosphoric acid catalyst, the $C_{12}$–$C_{18}$ olefins in this case comprising about 60% $C_{12}$ olefins and about 4 to 8% each of the $C_{13}$, $C_{14}$, $C_{15}$, $C_{16}$, $C_{17}$ and $C_{18}$ olefins. Alternatively the $C_{12}$–$C_{18}$ olefins may be obtained by polymerization of isobutylene with aluminum chloride or any other known polymerization catalyst and the olefins may consist chiefly of $C_{14}$–$C_{16}$ olefins or even higher olefins instead of $C_{12}$ olefins. The olefin stream should preferably contain about 50% and preferably about 60 to 70% or more of tertiary olefins, i. e. olefins in which at least one carbon atom attached to the double bond has no hydrogen atom attached to it. When the olefin charge contains appreciable amounts of deleterious impurities, improved yields can be obtained by giving it a pre-treatment with $H_2SO_4$ or clay in accordance with procedures well known in the art.

The olefin charge is introduced by line 10 into a glass-lined reactor 11 which is provided with a cooling water jacket 12 and a mechanical stirrer 13. Alkanesulfonic acid catalyst is introduced thereto through line 14 in an amount of about 5 to 25 weight percent, preferably about 10%, based on olefin charge. About 90% of the catalyst may be regenerated catalyst from line 16. The reactor in this case is operated at a temperature of about 30° C. and at approximately atmospheric pressure although it may be operated under any pressure up to about 50 p. s. i. g. and at a temperature in the range of about 0° C. to 50° C. The $H_2S$ is introduced into the vigorously stirred and intimately mixed catalyst-olefin mixture through line 15 at such a rate that it is nearly all absorbed and for a period of time required to effect the desired degree of conversion, the time usually being of the order of about .4 to 4 hours, usually about 1 to 3 or about 2 hours.

Although only a single reactor and regenerator are shown in the drawings, the use of two reactors and regenerators is preferred so that when the conversion in one reactor is substantially complete (as evidenced by a relatively sharp increase in $H_2S$ vented from line 17) the $H_2S$ stream can be introduced into the other reactor into which olefins and catalyst have been previously charged. When the introduction of $H_2S$ is diverted from reactor 11, the stirrer is stopped and the catalyst is allowed to settle. The settled catalyst is then withdrawn through line 19 to glass-lined vessel 20 which serves as a regenerator. This vessel is likewise provided with cooling jacket 21 and with a mechanical stirrer 22. Regeneration is effected by blowing air or other gas from line 23 through the stirred catalyst at a temperature of about 110°–140° C., e. g. about 120° C. while venting gases through line 24. This hot gas blowing technique apparently decomposes any alkanesulfonic acid esters which may have been formed and removes any water with which the catalyst may be contaminated on account of the presence of a small amount of sulfuric acid in the original catalyst mixture. After blowing for a period of about an hour or more the catalyst is cooled and returned by pump 25 and line 16 for effecting further conversion, any small amount of polymer and sulfur being separately withdrawn through line 25a.

After catalyst is removed from reactor 11 an aqueous caustic wash liquid, preferably a 20% NaOH solution, is introduced by line 26 in amounts of about 2 volume per cent and intimately admixed with the mercaptan-hydrocarbon mixture by means of stirrer 13. The stirrer is then stopped and spent caustic is withdrawn through line 27. More than one caustic wash may thus be employed and/or the caustic wash may be followed by a water wash although usually a single wash is sufficient. Alternatively a small amount, e. g. about 1% of a 50% caustic solution may be added to raw water washed mercaptan-hydrocarbon mixture and the entire mixture charged to the distillation step.

The washed acid-free mixture is introduced from the base of the reactor through line 28 to a vacuum still 29 and as soon as the charge is thus withdrawn from the reactor a fresh charge of olefin and catalyst is introduced thereto for further reaction. Vacuum still 29 is preferably operated under an absolute pressure of 100 mm. of mercury and it is heated by coil 30. The overhead passes through cooler 31 to receiver 32 which is evacuated by stem ejector 33. Condensate is removed by pump 34 and a part recycled by line 35 for reflux while net unreacted hydrocarbons are removed through line 36 for use in gasoline or fuel oil. The mercaptans withdrawn from the still through line 37 and cooler 38 may assay about 75 to 80% mercaptan. For close fractionation, a narrow boiling range fraction of olefin charge should be used, the corresponding mercaptans boil at about a 40° higher temperature, thus facilitating separation by vacuum distillation. If a light colored mercaptan is desired, the mercaptan can be taken overhead after the olefin is removed, leaving salts and color bodies as bottoms.

The alkanesulfonic acid which is employed as a catalyst may be produced as described in U. S. 2,433,395-6. These alkanesulfonic acids are reactive, strong, organic acids of unusual chemical stability. They usually vary in assay from about 93 to 100%, the impurities being water, sulfuric acid and traces of sulfoxides. For the present purpose the acids should be at least about 90 weight percent and it is desirable that they be substantially free from sulfuric acid. It appears that sulfuric acid is decomposed in the reactor to give free sulfur and water:

$$3H_2S + H_2SO_4 \rightarrow 4S + 4H_2O$$

Any water originally present or thus formed in the acid catalyst is removed therefrom by the hot air blowing in the regeneration step. While alkanesulfonic acids are hygroscopic, they are less so than sulfuric acids and they do not oxidize or char organic material like concentrated sulfuric acid does. While they are very corrosive toward common metals, they may be easily handled in glass-lined equipment with exposed metal surfaces being of stainless steel. They are stable at temperatures below 300° F., have low vapor pressures and are inert to chlorine and oxygen. Physical properties of the individual alkanesulfonic acids are approximately as follows:

*Physical properties of $C_1$–$C_4$ alkanesulfonic acids*

| Compound | B. P. | | M. P., ° C. | Specific Gravity, 25°/4° C. |
|---|---|---|---|---|
| | ° C. | at mm. Hg | | |
| $CH_3SO_3H$ | 122 | 1.0 | +20 | 1.4844 |
| $CH_3CH_2SO_3H$ | 123 | 1.0 | −17 | 1.3341 |
| $CH_3CH_2CH_2SO_3H$ | 136 | 1 | +7.5 | 1.2516 |
| $CH_3CH(SO_3H)CH_3$ | 123ª | 1 | | |
| $CH_3CH_2CH_2CH_2SO_3H$ | 147 | 0.5 | −15.2 | 1.1906 |

The properties of representative alkanesulfonic acid mixtures are as follows:

*Mixed alkanesulfonic acids*

Average molecular weight ____ 110–120
Specific gravity (25°/4° C.) ____ 1.30–1.35
Color ____ Light amber
Composition, weight percent:
    Alkanesulfonic acids ____ 94
    Water ____ 3
    $H_2SO_4$ ____ 3
    Ash ____ Less than 0.05

The amount of catalyst lost in the process due to solubility in the mercaptan layer and subsequent neutralization is usually less than 1%. If alkanesulfonic acid contains no sulfate ions regeneration may not be necessary but it appears to be desirable in any case in order to decompose any esters which may be formed from olefins in the reaction step. Blowing a used catalyst for about an hour at about 250° F. restores the catalyst to about 90° of its original activity.

While reactions between $H_2S$ and secondary olefins at temperatures below 60° C. proceed at such a low rate as to be practically negligible, this reaction proceeds at a reasonably rapid rate at temperatures of the order of 100 to 120° C. As a typical example, pure tetradecene–1 when reacted with an alkanesulfonic acid for six hours with $H_2S$ at 100° C. under atmospheric pressure gave a yield of 50% tetradecyl mercaptan–2 and 40% of di-sec tetradecyl thioether. Here again reaction rate may be increased by increase in pressure. Higher temperatures and pressures tend to favor secondary mercaptan production over thioethers.

If tertiary mercaptans are heated in the presence of catalytic amounts of alkanesulfonic acid to temperatures as high as about 80° C. the reaction is reversed and on heating for sufficient time at somewhat higher temperature the hydrogen sulfide can be quantitatively split out. Thus pure t-dodecyl mercaptan lost substantially the theoretical amount of $H_2S$ when it was heated for an hour at about 130° C. under a reflux column with 15 volume percent of ethane sulfonic acid. The resulting olefin on cooling and contacting with hydrogen sulfide at a temperature below 50° C. again absorbs hydrogen sulfide. This reversability of the reaction may be utilized for removing $H_2S$ from fluid and particularly gaseous streams, the $H_2S$ being removed from said streams by intimate contact at low temperature and the removed $H_2S$ then being recovered at the high temperature. The reversability also provides a method for separating tertiary olefins from other olefins since the mercaptans formed from the tertiary olfins may subsequently be heated with alkanesulfonic acid at high temperature for recovering the tertiary olefins. Such a reaction may be carried out for example in reactor 11 by charging a mercaptan instead of an olefin, avoiding the introduction of $H_2S$ and introducing high pressure steam instead of cooling water into the jacket so that the intimately stirred mixture may be held at a temperature of about 130 to 140° C. for a period of about 1 hour or more. In this case $H_2S$ will be vented through line 17, the acid may be withdraw and the product washed with caustic solution and the remaining olefin may be withdrawn via line 28 to a suitable receiver.

In the commercial unit hereinabove described, the $H_2S$ is supplied as a component of a byproduct refinery gas stream and such stream, or at least a part thereof, may be desulfurized simultaneously with the production of tertiary mercaptans. A natural gas containing large amounts of $H_2S$ may similarly be desulfurized while at the same time providing for utilization of the removed $H_2S$. For $H_2S$ removal it is not essential of course that $C_{12}$–$C_{18}$ olefin be employed since any tertiary olefin will react with $H_2S$ in the presence of alkanesulfonic acid to give the corresponding tertiary mercaptan. The $H_2S$ containing gas should of course be dried before it is introduced into the reactor since any moisture would have a deleterious effect on the catalyst. However acidic components such as $CO_2$ are not objectionable and are not removed with the $H_2S$.

The remarkable effectiveness of alkanesulfonic acids as hereinabove described is attributable in large measure to the intimacy of the admixture of liquid olefin with catalytic amounts of alkanesulfonic acid and the introduction into this intimate mixture of $H_2S$ at a rate at which it can be absorbed at the defined temperatures. Where $H_2S$ removal is the primary object sufficient olefins should be employed to effect substantially complete $H_2S$ removal. Where maximum yields of tertiary mercaptans are desired, the rate of $H_2S$ introduction, particularly at the end of the reaction, should be sufficient to provide a substantial excess of unabsorbed $H_2S$. Catalytic amounts of alkanesulfonic acid in this process are usually in the range of about 5% to about 25% based on total hydrocarbon charged, the preferred amount being about 10 weight percent. Based on olefin content of the charge the alkanesulfonic acid content may be as low as about 2% but decreased rates of reaction are obtained when smaller amounts of catalyst are used. Larger amounts of catalysts than hereinabove defined may of course be used without detriment to catalyst effectiveness but they are unnecessary for obtaining the desired conversion.

The invention is not limited to the precise type of stirred reactor herein described since it will be apparent to those skilled in the art that other mixing means and other types of reactors may be used. Also the various reactions may be effected in continuous systems. In some cases more effective regeneration may be obtained by diluting a relatively spent alkanesulfonic acid catalyst with a small amount of water sufficient to effect separation of an oil phase, separating the oil phase, then reconcentrating the alkanesulfonic acid under a reduced pressure preferably of the order of about .01 to 10 mm. absolute, at a temperature in the range of about 100 to 140° C. Regeneration requirements are minimized when the catalyst is substantially free from sulfuric acid and its content of sulfuric acid and/or sulfates is preferably less than about .3% by weight.

Also the invention is not limited to the use of distillation for separating mercaptans from hydrocarbons since other known methods of separation may be employed such, for example, as extraction with caustic methanol solutions.

We claim:

1. The method of making mercaptans having about 12 to 18 carbon atoms per molecule which method comprises intimately mixing a liquid hydrocarbon charging stock containing substantial amounts of $C_{12}$–$C_{18}$ tertiary olefins with a catalytic amount of liquid alkanesulfonic acid catalyst and introducing $H_2S$ into the liquid phase mixture at a temperature in the range of about 0° C. to about 60° C.

2. The method of making a tertiary mercaptan which comprises vigorously stirring a liquid charging stock containing a $C_{12}$–$C_{18}$ tertiary olefin in admixture with an amount of liquid alkanesulfonic acid in an amount in the range of about 5 to 25 weight percent based on said charging stock, introducing a gas comprising $H_2S$ into the liquid phase mixture with continued stirring at a temperature in the range of about 0° C. to about 60° C. and continuing the introduction of $H_2S$ until a substantial amount of the tertiary olefin is converted to tertiary mercaptan.

3. The method of making tertiary mercaptans having about 12 to 18 carbon atoms per molecule which method comprises intimately mixing a liquid hydrocarbon charging stock containing substantial amounts of $C_{12}$–$C_{18}$ tertiary olefins with a catalytic amount of liquid alkanesulfonic acid catalyst, introducing $H_2S$ into the intimate liquid phase mixture while maintaining it at a temperature in the range of about 0° C. to about 50° C. for a period of time sufficient to effect substantial conversion of tertiary olefins to tertiary mercaptans, settling and removing the catalyst from mercaptans and unreacted hydrocarbons, removing free acid from unreacted hydrocarbons and mercaptans and distilling unreacted hydrocarbons from acid-free mercaptans.

4. The method of claim 3 which includes the further steps of blowing removed catalyst with a gas at a temperature in the range of about 110 to 140° C. for effecting regeneration of said catalyst and employing at least a part of the regenerated catalyst for effecting further conversion.

5. The method of claim 3 which includes the step of pretreating the olefin-containing charging stock with clay before admixing alkanesulfonic acid catalyst therewith.

6. The method of claim 3 which includes the step of drying the $H_2S$ containing gas before introducing it into the catalyst-olefin mixture.

7. The method of regenerating a liquid alkanesulfonic acid catalyst which has been employed for effecting liquid phase reaction between $H_2S$ and a $C_{12}$–$C_{18}$ tertiary olefin which method comprises maintaining said catalyst at a temperature above 100° C. but not substantially higher than about 140° C., for a period of time sufficient to effect removal of water therefrom.

8. The method of claim 7 which includes the step of blowing an inert gas through said catalyst while it is maintained at the defined temperature.

9. The method of claim 7 which includes the initial steps of adding water to said catalyst in amounts sufficient to effect separation of an oil phase and removing said oil phase and which also includes the step of employing reduced pressure while maintaining said catalyst at the defined temperature.

10. The method of separating a $C_{12}$–$C_{18}$ tertiary olefin from a non-tertiary olefin of about the same boiling point which method comprises converting the tertiary olefin to tertiary mercaptan by intimately contacting the olefin mixture in liquid phase condition with a catalytic amount of liquid alkanesulfonic acid catalyst at a temperature in the range of about 0° C. to about 60° C. while introducing $H_2S$ into said liquid mixture, removing catalyst from the reaction mixture and separating tertiary mercaptan from unreacted olefin.

11. The method of claim 10 which includes the steps of separating tertiary mercaptan from unreacted olefin by distillation at reduced pressure and subsequently contacting the tertiary mercaptan with a catalytic amount of alkanesulfonic acid at a temperature in the range of about 120° C. to 140° C. for a period of time sufficient to effect elimination of mercaptan sulfur as $H_2S$.

12. The method of converting a $C_{12}$–$C_{18}$ tertiary mercaptan to an olefin which comprises intimately mixing said mercaptan with a catalytic amount of liquid alkanesulfonic acid and prolonging said intimate contact at a temperature in the range of about 110° C. to about 140° C. for a time sufficient to effect removal of substantially all of the sulfur in the form of $H_2S$.

13. The method of removing $H_2S$ from a gaseous stream containing said $H_2S$ which method comprises introducing said stream into an intimate mixture of liquid $C_{12}$–$C_{18}$ tertiary olefin and a liquid alkanesulfonic acid, the amount of alkanesulfonic acid being about 5 to 25 weight per cent based on said olefin, contacting said gaseous stream with said liquid mixture of tertiary olefin and alkanesulfonic acid to a temperature in the range of 0° C. to 60° C. for a time sufficient to effect reaction of $H_2S$ contained in said stream with the olefin to produce tertiary mercaptan and withdrawing from the liquid mixture components of the gaseous stream from which $H_2S$ has been removed.

WAYNE A. PROELL.
WILLIAM F. WOLFF.

REFERENCES CITED

The following references are of record in the file of this patent:

UNITED STATES PATENTS

| Number | Name | Date |
|---|---|---|
| 1,836,171 | Johansen | Dec. 15, 1931 |
| 2,252,138 | Rutherford | Aug. 12, 1941 |
| 2,386,772 | Badertscher et al. | Oct. 16, 1945 |